(12) United States Patent
Bisplinghoff et al.

(10) Patent No.: US 11,405,256 B2
(45) Date of Patent: Aug. 2, 2022

(54) APPARATUS AND METHOD FOR RECEIVING QUADRATURE AMPLITUDE MODULATED "QAM" SYMBOL

(71) Applicant: Cisco Technology, Inc., San Jose, CA (US)

(72) Inventors: Andreas Bernhard Bisplinghoff, Forchheim (DE); Stefan Helmut Müller-Weinfurtner, Nuremberg (DE)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 17/374,483

(22) Filed: Jul. 13, 2021

(65) Prior Publication Data
US 2022/0045895 A1 Feb. 10, 2022

(30) Foreign Application Priority Data
Aug. 6, 2020 (GB) ...................................... 2012279

(51) Int. Cl.
*H04L 27/38* (2006.01)
(52) U.S. Cl.
CPC ...... *H04L 27/3863* (2013.01); *H04L 27/3818* (2013.01)
(58) Field of Classification Search
CPC ..... H04L 27/34; H04L 27/38; H04L 27/3809; H04L 27/3845; H04L 27/3854; H04L 27/3863; H04L 27/3872; H04L 27/3818
See application file for complete search history.

(56) References Cited

U.S. PATENT DOCUMENTS

| | | | |
|---|---|---|---|
| 5,519,356 A | 5/1996 | Greenberg | |
| 9,634,878 B1 * | 4/2017 | Bench | H04L 27/3455 |
| 10,326,634 B2 * | 6/2019 | Zhang | H04L 27/36 |
| 2004/0264618 A1 * | 12/2004 | Zogakis | H04L 27/38 |
| | | | 375/371 |

(Continued)

OTHER PUBLICATIONS

K. Hyun, et al., "Bit metric generation for Gray coded QAM signals", IEE Proc.-Commun., vol. 152, No. 6, Dec. 2005, 5 pages.

(Continued)

*Primary Examiner* — Siu M Lee
(74) *Attorney, Agent, or Firm* — Edell, Shapiro & Finnan, LLC

(57) ABSTRACT

Techniques are presented for receiving Quadrature Amplitude Modulated (QAM) symbols from a transmitter via a transmission path. In one example, a demodulator is configured to down-convert an incoming Radio Frequency (RF) signal to a baseband signal and convert the baseband signal to digital samples, and output the digital samples. A demapper is configured to receive the digital samples output from the demodulator and output data encoded in QAM symbols. The demapper is further configured to: determine from a constellation of QAM symbols a subset of QAM symbols that a digital sample from the demodulator may represent; apply an offset to each QAM symbol in the subset of QAM symbols of the constellation to result in a subset of offset QAM symbols; determine which QAM symbol in the subset of offset QAM symbols the digital sample most likely represents; and output data representing a determined QAM symbol.

20 Claims, 13 Drawing Sheets

(56) References Cited

U.S. PATENT DOCUMENTS

| | | | |
|---|---|---|---|
| 2012/0250805 A1* | 10/2012 | Shin | H04L 27/3444 |
| | | | 375/341 |
| 2012/0307942 A1* | 12/2012 | Bae | H04L 27/38 |
| | | | 375/320 |
| 2014/0003546 A1* | 1/2014 | Rosenhouse | H04L 25/067 |
| | | | 375/262 |
| 2017/0279652 A1 | 9/2017 | Guo et al. | |
| 2018/0097579 A1 | 4/2018 | Chen et al. | |
| 2019/0215223 A1 | 7/2019 | Chen et al. | |

OTHER PUBLICATIONS

Search Report for Corresponding Application No. GB2012279.2, dated Jan. 27, 2021, 4 pages.

* cited by examiner

APPARATUS AND METHOD FOR RECEIVING QUADRATURE AMPLITUDE MODULATED "QAM" SYMBOL

CROSS REFERENCE TO RELATED APPLICATION

This application claims priority to United Kingdom Application No. 2012279.2, filed Aug. 6, 2020, the entirety of which is incorporated herein by reference.

TECHNICAL FIELD

The present disclosure relates generally to digital communications; and more particularly to higher order modulations used in high-speed digital communication systems.

BACKGROUND

Modern optical communications systems now routinely employ coherent detection and digital signal processing in the transmission of data along optical signal paths between transmission and receiver devices. In such systems, information is encoded into the modulated amplitude, phase, and polarization of an optical signal, achieving very high optical channel capacity compared with systems using, for example, on-off keying only.

BRIEF DESCRIPTION OF THE FIGURES

Examples of the present disclosure will now be explained with reference to the accompanying figures.

DESCRIPTION OF EXAMPLE EMBODIMENTS

Overview

Figure 1:
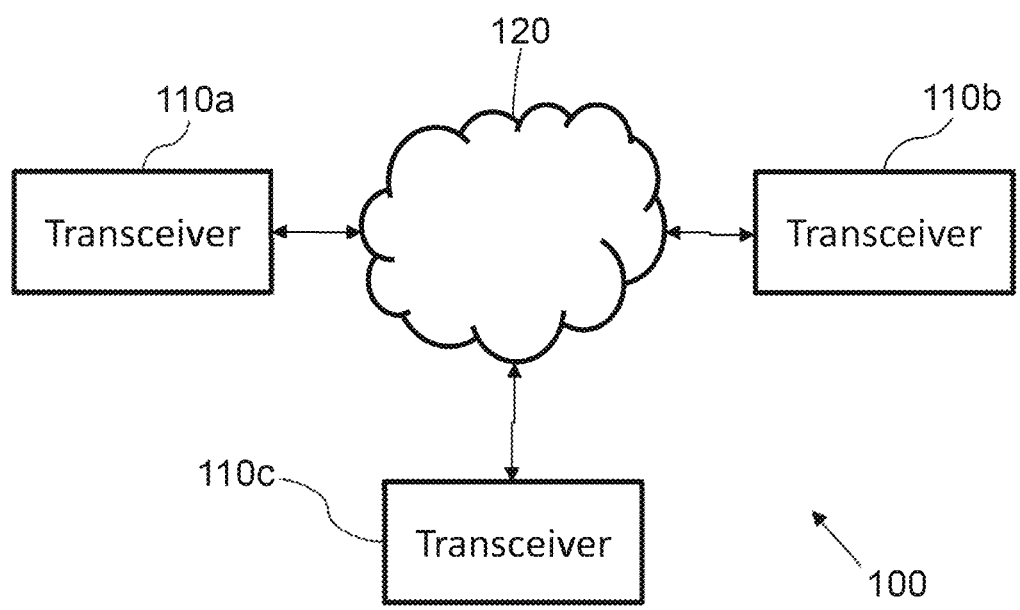
FIG. 1 is a block diagram of an example of a communication system in which the techniques presented herein may be employed.

There is provided a method of receiving Quadrature Amplitude Modulated (QAM) symbols from a transmitter via a transmission path, the method comprising: down-converting an incoming Radio Frequency (RF) signal to a baseband signal and converting said baseband signal to digital samples; determining from a constellation of QAM symbols a subset of QAM symbols that a digital sample may represent; applying an offset to each QAM symbol in the subset of QAM symbols of the constellation to result in a subset of offset QAM symbols; determining which QAM symbol in the subset of offset QAM symbols the digital sample most likely represents; and outputting data representing a determined QAM symbol.

There is also provided a receiver for receiving QAM symbols from a transmitter via a transmission path, the receiver comprising: a demodulator configured to down-convert an incoming RF signal to a baseband signal and convert said baseband signal to digital samples, and output said digital samples; and a demapper coupled to receive the digital samples output from the demodulator and configured to output data encoded in QAM symbols, wherein the demapper is configured to: determine from a constellation of QAM symbols a subset of QAM symbols that an digital sample from said demodulator may represent; apply an offset to each QAM symbol in the subset of QAM symbols of the constellation to result in a subset of offset QAM symbols; determine which QAM symbol in the subset of offset QAM symbols the digital sample most likely represents; and output data representing a determined QAM symbol.

There is also provided a non-transitory computer-readable medium comprising instructions for receiving QAM symbols from a transmitter via a transmission path, wherein the instructions, when executed by a computer, cause the computer to: down-convert an incoming RF signal to a baseband signal and converting said baseband signal to digital samples; determine from a constellation of QAM symbols a subset of QAM symbols that a digital sample may represent; apply an offset to each QAM symbol in the subset of QAM symbols of the constellation to result in a subset of offset QAM symbols; determine which QAM symbol in the subset of offset QAM symbols the digital sample most likely represents; and output data representing a determined QAM symbol.

Example Embodiments

In digital communication systems, a variety of digital modulation schemes may be employed for the transfer of digital information. Quadrature amplitude modulation (QAM) is a modulation method in which the optical waveform transmitted through an optical channel comprises a combination of phase-shift keying (PSK) and amplitude-shift keying (ASK). Optical signals typically comprise an in-phase (I) component and a quadrature-phase (Q) component, which constitute the complex plane in which QAM operates, in each polarization X and Y. Higher order QAM modulation schemes (e.g. 64 QAM, 128 QAM or 256 QAM) are becoming increasingly common as signal processing becomes more efficient and data rates increase. However, the faster data rates and increased spectral efficiency provided by the higher order modulation techniques are by their nature more susceptible to noise and interference.

Digital modulations are generally susceptible to noise and other signal impairments introduced by the communication channel. Optical signals become distorted during their transmission along an optical signal path. In the case of optical fibres, imperfections in the surface of the fibre, or asymmetries in the cross-section of the fibre will cause distortion. Different path lengths inside the fibre will cause timing-related distortion effects. Multiple digital modulations are employed in a variety of digital communication systems, e.g., in data traffic generally, digital subscriber lines (DSLs), router systems, and a wide variety of wireless systems.

To cope with different channel conditions, some high-speed digital communication systems use a multitude of digital modulations, e.g., QPSK, 16 QAM, 32 QAM, 64 QAM, 128 QAM, 256 QAM etc., and different levels of coding and transmit power. While one channel may support a lower order modulation, e.g., QPSK, permitting only a lower data rate, another channel may support a higher order modulation, e.g., 64 QAM, providing higher data rate. Commonly used coding schemes include forward error correction (FEC) coding such as Reed-Solomon coding and inner channel coding such as convolutional coding, trellis coded modulation, or Turbo Coding, etc.

The particular manner in which higher order constellations are constructed and the way in which coding is employed and bits are mapped onto modulation symbols represents an important topic in designing communication systems.

Advanced coherent communication systems modulate the digital data signal with high-order constellations such as 64 QAM or larger. Reception reliability is limited by random noise. Since this noise is usually additive following a Gaussian distribution, information theory then says that for maximum mutual information when transmitting across such a channel at given average transmit power, the transmit-signal distribution shall also approach a Gaussian shape. The performance gap between non-optimum transmission with uniform QAM signal points and an optimally adapted Gaussian transmit signal is up to 1.53 dB for large constellations. For this reason, a uniform QAM requires higher average transmit power.

FIG. 1 is a block diagram illustrating a communication system 100 that is constructed according to/operating according to the present disclosure. The communication system 100 includes a plurality of transceiver devices (three of which are shown as 110a, 110b, and 110c, collectively transceiver devices 110). Each of the transceiver devices 110a-110c communicatively couples to a network 120 that facilitates communications between the transceiver devices. While the network 120 is shown as a single entity, it is understood that the network 120 includes a plurality of elements including signal paths e.g. optical fibre, routers, splitters, couplers, relays, and amplifiers, for example. The transceiver devices 110 may comprise modem (modulate-demodulate) devices.

The network 120 supports communications between the transceiver devices 110a-110c. A transceiver device 110a-110c may provide a number of services including audio, video, local access channels, as well as any other service known in the art. Each of these services is provided to one or more users corresponding to transceiver devices 110a-110c.

A service provider employs a transceiver device 110c to provide network access services to the transceiver devices 110a-110b, e.g., to allow the users to access the Internet, Wide Area Networks, and other data services. A transceiver device 110c may receive incoming traffic from the transceiver devices 110a-110b and route it to an Internet Service Provider (ISP) for coupling to the Internet. At the transceiver device 110c, the service provider may also include a number of resources for providing third-party ISP access, accounting and logging purposes, dynamic host configuration protocol (DHCP) assignment and administration, the storage of Internet protocol (IP) addresses for the transceiver devices 110a-110b, and server control.

Downstream information flows to the transceiver devices 110a-110b from the transceiver device 110c. Upstream information flows from the transceiver devices 110a-110b to the transceiver device 110c. In a typical installation, the transceiver device 110c services as many as 1,000 transceiver devices 110a-110b on a single 75 GHz bandwidth channel. A single channel having a bandwidth of 75 GHz is capable of line rates of 600 Gbit per second of total throughput.

Figure 2A:
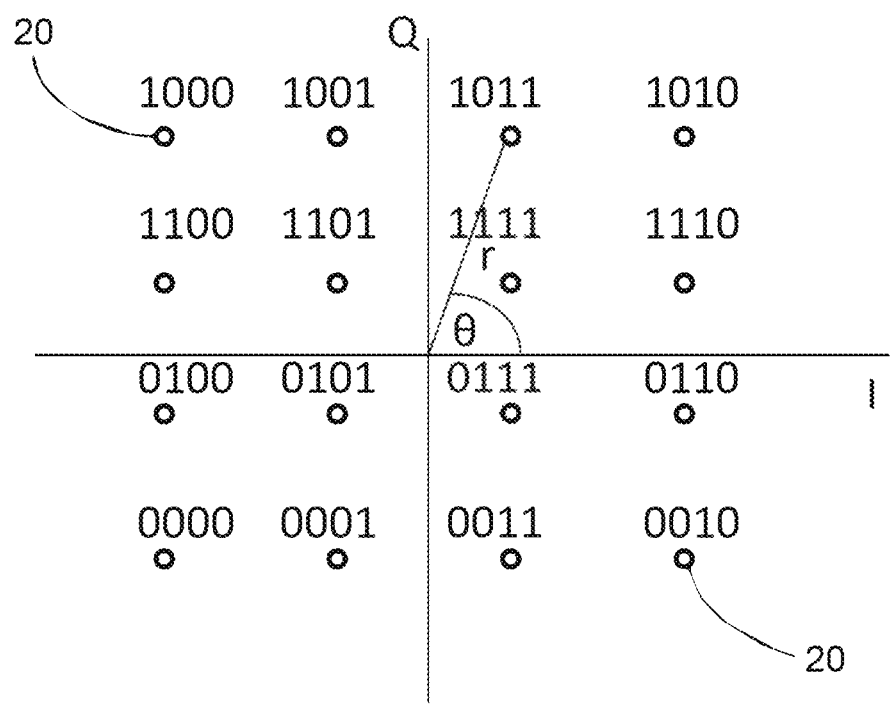
FIG. 2A is a diagram illustrating Quadrature Amplitude Modulation (QAM) in connection with which the techniques presented herein may be used.

FIG. 2A is a diagram illustrating Quadrature Amplitude Modulation (QAM). In QAM a received digital data sequence is mapped into a signal point sequence. For ease, 16 QAM is illustrated. 16 QAM is illustrated as a square 4×4 constellation, with each point 20 in the constellation representing a symbol. The symbol represents a bit pattern e.g. in 16 QAM there are 16 symbols with each representing a 4-bit pattern (e.g. 1000, 1001, 1011 etc. as shown in FIG. 2A). Similarly 64 QAM may use a square 8×8 constellation of 64 symbols each representing a 6-bit pattern and 256 QAM may use a square 16×16 constellation of 256 symbols each representing a 9 bit pattern, and so on. Each symbol can be denoted by a phase θ and an amplitude r or equivalently by a real and an imaginary amplitude. 16 QAM has four bits per symbol, so to encode for example a received digital data sequence of 12 bits, the 12 bits are broken into three groups of four bit, and each group may be encoded by one QAM symbol, thereby only using 3 symbols and the received digital data sequence of 12 bits is mapped into a 3 signal point sequence. 64 QAM has six bits per symbol, so to encode 12 bits, the 12-bit string is divided into two groups of six, thereby only using two symbols, and the received digital data sequence of 12 bits is mapped into a 2 signal point sequence.

Figure 2B:
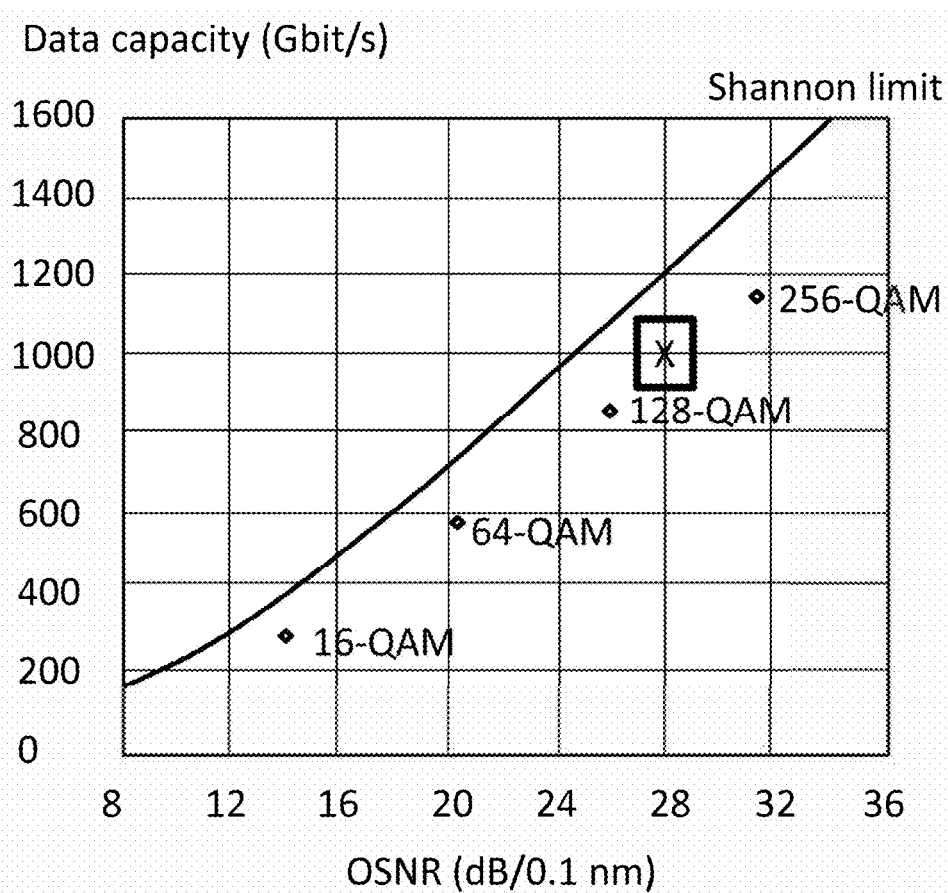
FIG. 2B is a diagram illustrating data capacity versus optical Signal-to-Noise Ratio (SNR) and the Shannon limit.

FIG. 2B is a diagram illustrating data capacity versus optical Signal-to-Noise Ratio (SNR) and the Shannon limit. The Shannon limit of a communication channel refers to the maximum rate of error-free data that can theoretically be transferred over the channel if the link is subject to random data transmission errors, for a particular noise level. FIG. 2B shows various QAM levels. So, for instance, if a data capacity of 1000 Gbit/s is needed then 128 QAM is insufficient and 256 QAM will be needed, considering 96 Gbaud per second as a line-rate including some redundancy for FEC.

Figure 3:
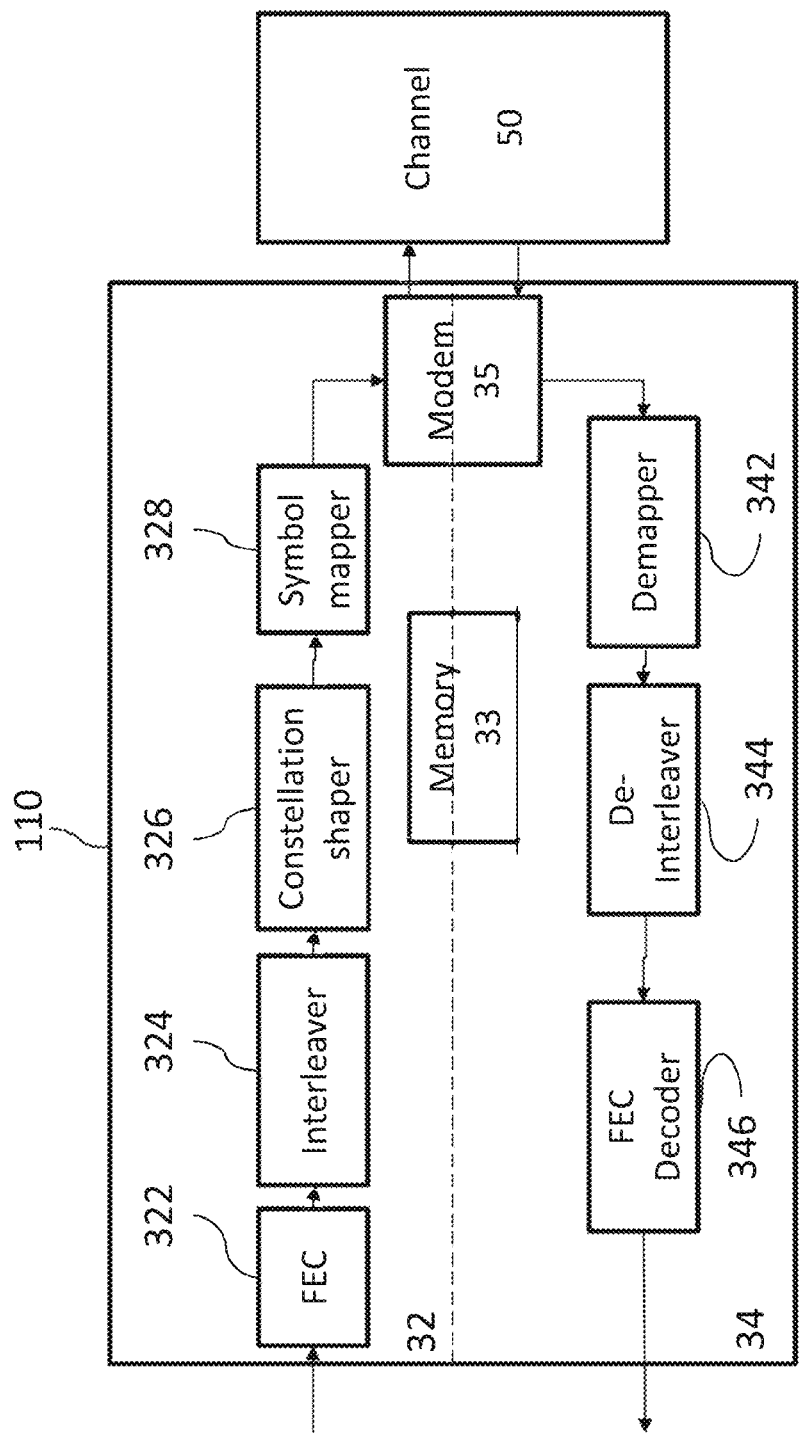
FIG. 3 is a block diagram illustrating examples of components of a transceiver device configured to perform techniques presented herein.

FIG. 3 is a block diagram illustrating the components of the transceiver devices 110a-110c. As the name suggests, each transceiver device 110a-110c comprises a transmitter part 32 and a receiver part 34. A signal for transmission is encoded by the transmitter part 32 of a transceiver device e.g. transceiver device 110a and then transmitted from the transceiver device 110a via a transmission channel 50 to another transceiver device e.g. transceiver device 110c, where the received signal is decoded by the receiver part 34 of the receiving transceiver device 110c. Memory 33 is illustrated and any of the components of the transceiver device may access, write to or read from the memory 33 as required. A computer-readable medium may be provided comprising instructions which, when executed by a computer, cause the computer to carry out the method described herein. These instructions may be stored in memory 33. A modulator-demodulator unit (known as a modem) 35 modulates data to be transmitted prior to their transmission upon the transmission channel 50 and demodulates data received from the transmission channel 50. The modem 35 modulates and demodulates the symbols according to the modulation requirements of the transmission channel 50 (e.g. in frequency) and the modulated symbols are transmitted via transmission channel 50 to a receiver part 34 of another transceiver device.

Persons skilled in the art of signal modulation and demodulation will appreciate that the components illustrated in FIG. 3 are a subset of the components that are contained within a modem/transceiver device 110a-110c but a simplified version is illustrated for the ease of understanding the disclosure.

Turning firstly to the transmitter part of a transceiver device, in an embodiment, the transmitter part 32 of a transceiver device comprises a FEC encoder 322, an interleaver/randomiser 324, a constellation shaper 326 and a symbol mapper 328 and the modulator part of modem 35. The FEC encoder 322 receives information bits and codes the plurality of information bits to produce a plurality of FEC blocks. The FEC encoder 322 may, for instance, employ Reed-Solomon coding in concatenation with another type of FEC coding, such as trellis coding, convolutional coding, Turbo Coding, or another type of channel coding. Interleaver 324 receives the plurality of FEC blocks from FEC block encoder 322, interleaves the FEC blocks and randomizes the FEC blocks to produce a plurality of interleaved and randomized FEC blocks.

Constellation shaper 326 receives the plurality of interleaved and randomized FEC blocks and operates on the plurality of interleaved and randomized FEC blocks to produce a plurality of binary labels BLs. A Binary Label is the bit pattern (e.g. 1001) represented by a symbol. The transmitter includes a constellation shaper 326 when constellation shaping is to be used. If constellation shaping is not to be applied, then a constellation shaper 326 maybe omitted. A symbol mapper 328 receives the Binary Labels (BLs) and maps the bits of the binary labels BLs to modulation symbols. The symbol mapper 328 produces a plurality of modulation symbols that are input to modem (modulator/demodulator) 35. The modulation symbols produced by the symbol mapper 328 may be converted in frequency by modem 35 prior to their transmission upon the transmission channel 50. The modem 35 modulates the symbols according to the modulation requirements of the transmission channel 50 and the modulated symbols are transmitted via transmission channel 50 to a receiver part 34 of another transceiver device.

This disclosure relates to the receiver part of a transceiver device and so further discussion relating to the transmitter part will not be provided.

Turning now to the receiver part of a transceiver device, the receiver part 34 of a transceiver device comprises the demodulator part of the modem 35, a demapper 342, a de-randomiser/de-interleaver 344 and a Forward Error Corrector (FEC) decoder 346. The demodulator down-converts an incoming radio frequency (RF) signal received on the transmission channel 50 to baseband and converts the baseband signal to digital samples. The demapper 342 receives the digital samples that have been operated on by transmission channel 50 and demodulated by modem 35 and de-maps the digital samples to output data encoded in QAM symbols (according to the coding employed by a symbol mapper in the transmitter part 32 of the transmitting transceiver device). The output of demapper 342 is received by de-randomizer/de-interleaver 344, which de-randomizes and then de-interleaves the received data. The output of de-interleaver 344 is received by the FEC decoder 346, which performs FEC decoding upon the received data bits. FEC decoder 346 produces recovered information bits that correspond to the information bits transmitted by the transmitting transceiver device absent errors introduced by the transmission channel 50 and/or other components of the communication path.

Coherent reception of a digital data signal modulated with high-order constellations such as 64-QAM suffers not only from random noise effects, but also from non-linear distortions caused by for example the transmit amplifier, transmission channel, or receive circuitry. These deterministic non-linear effects may be due to a dominating unit along the transmit path, inherent characteristics of the transmitter or receiver, or due to a combination of influences. As a consequence, the received signal points are no longer located on the expected equidistant square grid typical for the employed QAM modulation format. Each signal point exhibits a long-term-stable individual shift against its respective nominal point.

Hard-decision error-rate—and most detrimental—soft-value quality generated for physical bits suffer from this ill-scaled and skewed receive signal, when an ideal constellation is assumed to be present in the receiver. Note that the term soft value is used as a synonym for log-likelihood ratio (LLR) in this disclosure. When reception does not take this impairment into account, the receiver sensitivity degrades for the digital communication link, be it wireless radio, copper line, or an optical-fibre system. This means less achievable reach or it mandates higher transmit power since higher-than-necessary SNR is required at the receiver. On the other hand, optimally accounting for that impairment when splitting the received signal into constellations for LLR calculation is complex and resource intensive.

There is therefore proposed a technique for addressing this issue. The proposed method for adaptive demapping with soft output constitutes a desirable compromise between complexity and performance. In one particular multi-level coding application, a soft-value is needed for the least-significant bit (LSB) per I/Q component, only, i.e. one soft value per dimension. This soft value is input to soft decoding of the underlying forward error correction (FEC) code. All other bits belong to uncoded bit layers that require hard decision for most-significant bit (MSBs), only, plus the decoded FEC result. The method also works for non-square constellations and can—with increasing complexity—be extended to two or more soft values per dimension. In optical systems, the two polarizations can be treated independently with identical units, providing receive-side compensation.

To reduce complexity, the input data is first sliced into sectors in the complex plane corresponding to determine a subset of signal points (also known as QAM symbols) of the constellation (e.g. a group of four signal points), which may be referred to as a QPSK sub-constellation. Similarly, the technique also provides for the adaptive compensation of an individual offset per signal point.

Figure 4:
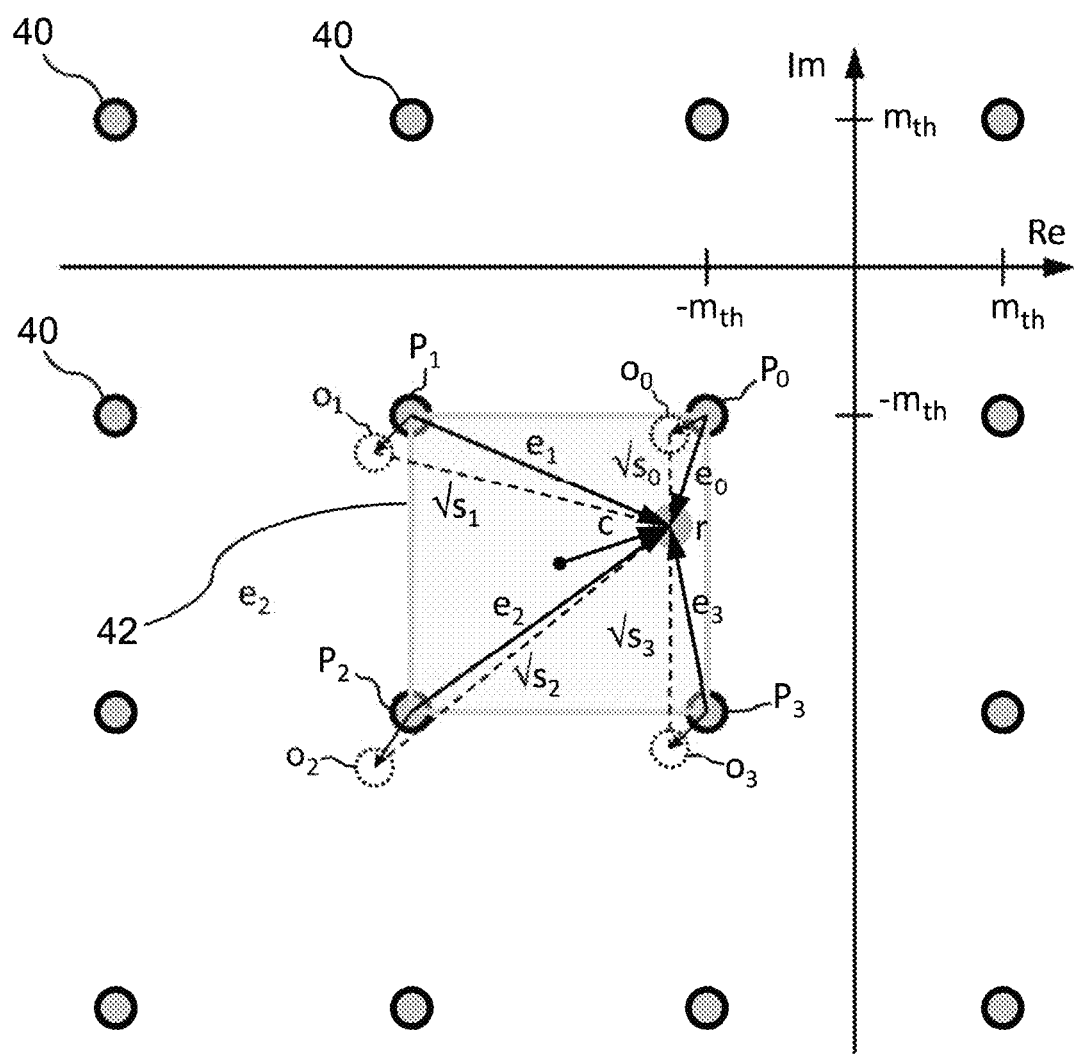
FIG. 4 illustrates a received value r, a center-offset value c for the sector associated with received value r, sector-corner points P, error values e and offset values o for four points P defining a sector in a QAM constellation in accordance with techniques presented herein.

Reference is now made to FIG. 4. FIG. 4 illustrates part of a large QAM nominal constellation with all quadrants shown partially, i.e. the constellation may extend further in all directions. A complex-valued signal plane is shown with received IQ signal r inside the boundary of the nominal constellation. Signal points 40 are nominal signal points (or symbol points) on the non-distorted QAM constellation. Sector 42 represents a subset of QAM symbols that a digital sample r from said QAM demodulator may represent. In FIG. 4, the subset of QAM symbols that output sample r from said QAM demodulator may represent includes the four symbol points $P_0$, $P_1$, $P_2$ and $P_3$. This subset of QAM symbols is identified as sector 42 in the constellation, with the output sample r being within this sector. This sector 42 is identified by an identifier SecId. How the sector 42 is determined will be described later on in this disclosure. The sector identity (SecId) is unique and allows for hard decision of the MSBs associated with the output sample r.

For the selected sector 42, a complex-valued center offset value c consisting of a real and an imaginary amplitude from the center of sector 42 to the output sample r is calculated. Error vectors e0, e1, e2, e3 (complex-valued) from the nominal symbol points P of the subset of symbol points to the output sample r are also calculated. Further, the per-symbol offsets o0, o1, o2, o3 (complex-valued) with the associated corrected QAM symbols (dotted circles) and their Euclidean distance $\sqrt{s0}$, $\sqrt{s1}$, $\sqrt{s2}$, $\sqrt{s3}$ (real-valued, dashed lines) with respect to the output sample r are shown. The center offset c and squared Euclidean distances s0, s1, s2, s3 are explained further below.

FIG. 4 shows the constellation comprising square sectors with identical size. However, it is not intended that this disclosure be limited to such implementation and application to both non-square sectors (e.g. triangular, hexagonal etc.) and different sizes per sector are envisaged. FIG. 4 shows symbol points for a nominally equidistant and square QAM constellation. However, it is not intended that this disclosure be limited to such implementation and application to both non-square constellations and different sizes of constellations are envisaged.

By sector slicing (by comparison of received symbol r against thresholds) a large, e.g. 144-QAM, constellation is split into a plurality of QPSK-like sub-constellations (also referred to herein as sectors or subsets of QAM symbols). Per-symbol IIR (Infinite Impulse Response) filtering of extracted error vectors e0, e1, e2, e3 to the closest QPSK corner at a time serves as an offset correction o0, o1, o2, o3 to improve the LLR quality when the nominal constellation becomes distorted. LLRs give a good indication for reliability of bits in the received output sample r. Non-linear constellation distortions lead to I and Q becoming dependent, even though without impairment they are independent. Hence, non-linear constellation distortions-corrected LLR computation for FEC decoding treats I/Q jointly by means of squared Euclidean distances s0, s1, s2, s3 to the four ideal QPSK corners P1, P2, P3, P4 in the complex plane of the sub-constellation.

Figure 5:
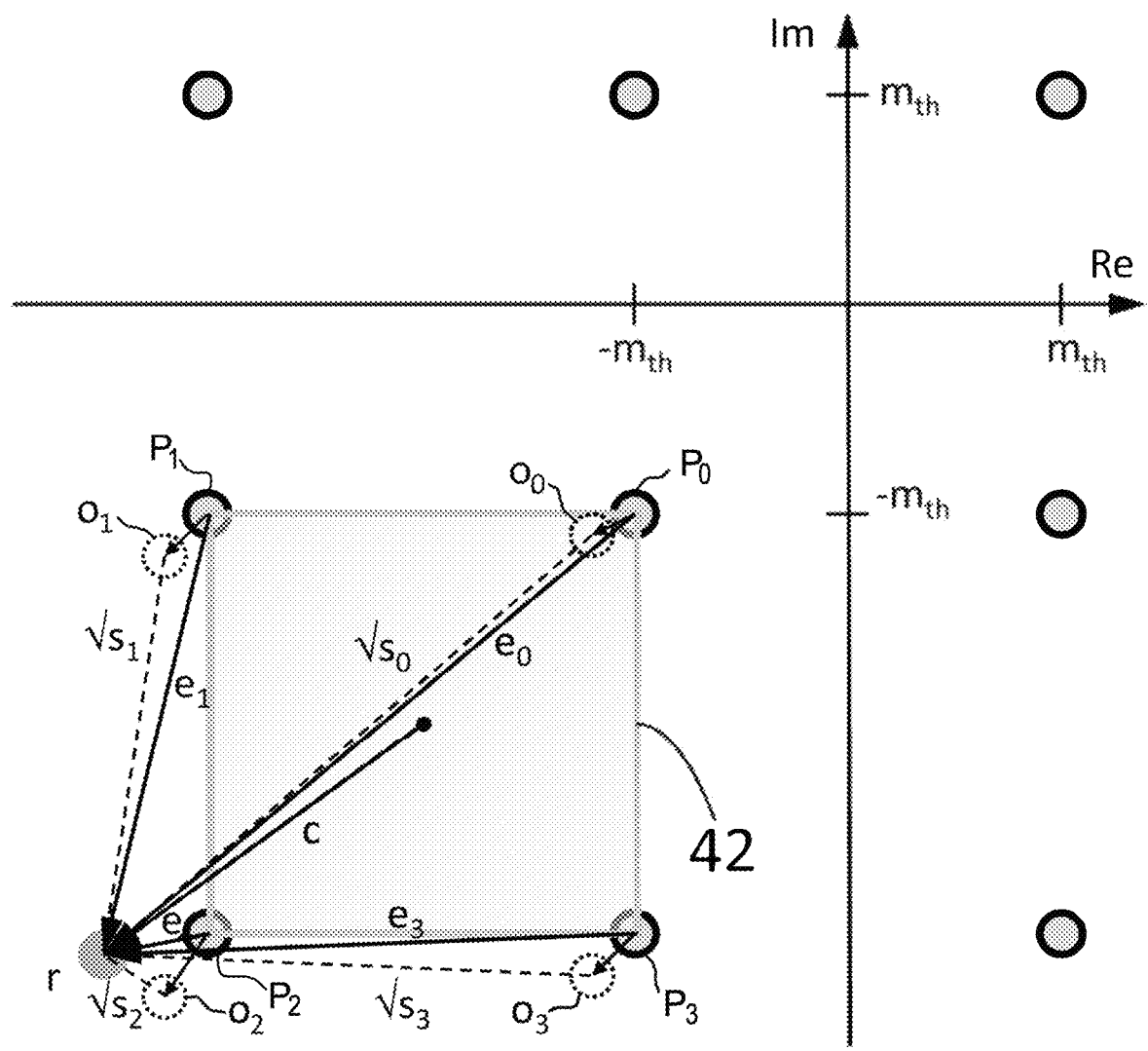
FIG. 5 illustrates similar quantities for a received value r that is outside the points of a QAM constellation in accordance with techniques presented herein.

FIG. 5 is comparable to FIG. 4, but illustrates part of a 16 QAM nominal constellation with the bottom left quadrant of this constellation shown in full and the other quadrants shown partially. It shows the complex-valued signal plane for the situation of the received IQ signal r being outside the nominal constellation boundary. This usually leads to soft values with large magnitude. FIG. 5 shows a corner case with the received signal sample r being outside the nominal QAM constellation. However, according to the technique described herein, sector selection stays inside the allowed range defined by the respective QAM constellation. Hence, the received signal r is not guaranteed to be located inside a sector of the nominal constellation and center offset c may also leave the sector 42. The resulting soft-value magnitudes are large due to the strong difference of competing Euclidean distances. For good receiver performance, it is important to provide some magnitude headroom to accommodate LLR for these strong bits. For the selected sector 42, a center offset value c to the output sample r is shown. Error vectors e0, e1, e2, e3 from the nominal symbol points P of the subset of symbol points to the output sample r are also shown. Further, the per-symbol offsets o0, o1, o2, o3 with the associated corrected QAM symbols (dotted circles) and their Euclidean distance $\sqrt{s0}$, $\sqrt{s1}$, $\sqrt{s2}$, $\sqrt{s3}$ (dashed lines) with respect to the output sample r are shown.

Although the above embodiment describes determining from a constellation of QAM symbols a subset of QAM symbols that a digital sample from said QAM demodulator may represent, with there being four QAM symbols P0, p1, p2, p3, it is not intended that this disclosure be limited to subsets of four. For example, symbols may be arranged in a triangular formation in the constellation and sectors may be defined by three symbols points and, in this case, when determining from a constellation of QAM symbols a subset of QAM symbols that a digital sample from said QAM demodulator may represent, a subset of three QAM symbols may be determined.

This disclosure covers the processing in the first functional unit of a soft-decision forward error correction (SD-FEC) block of the demapper 342 in the receive (Rx) path of a coherent optical link. The proposed ASIC-implementation-friendly adaptive soft-output demapping (ASOD) functionality compensates for non-linear constellation distortions, which otherwise would compromise the receiver sensitivity. Input comprises two received I/Q sample streams, one for X polarization and one for Y polarization, both delivered from a modem block. Output comprises per-polarization soft values for the least-significant bits (LSBs) mapped into the I/Q constellation and hard decisions for all other bits. These soft values are input to e.g. a convolution decoder or any other soft-decodable error correction method. There may also be demultiplexing and de-interleaving involved in the downstream processing.

Figure 6:
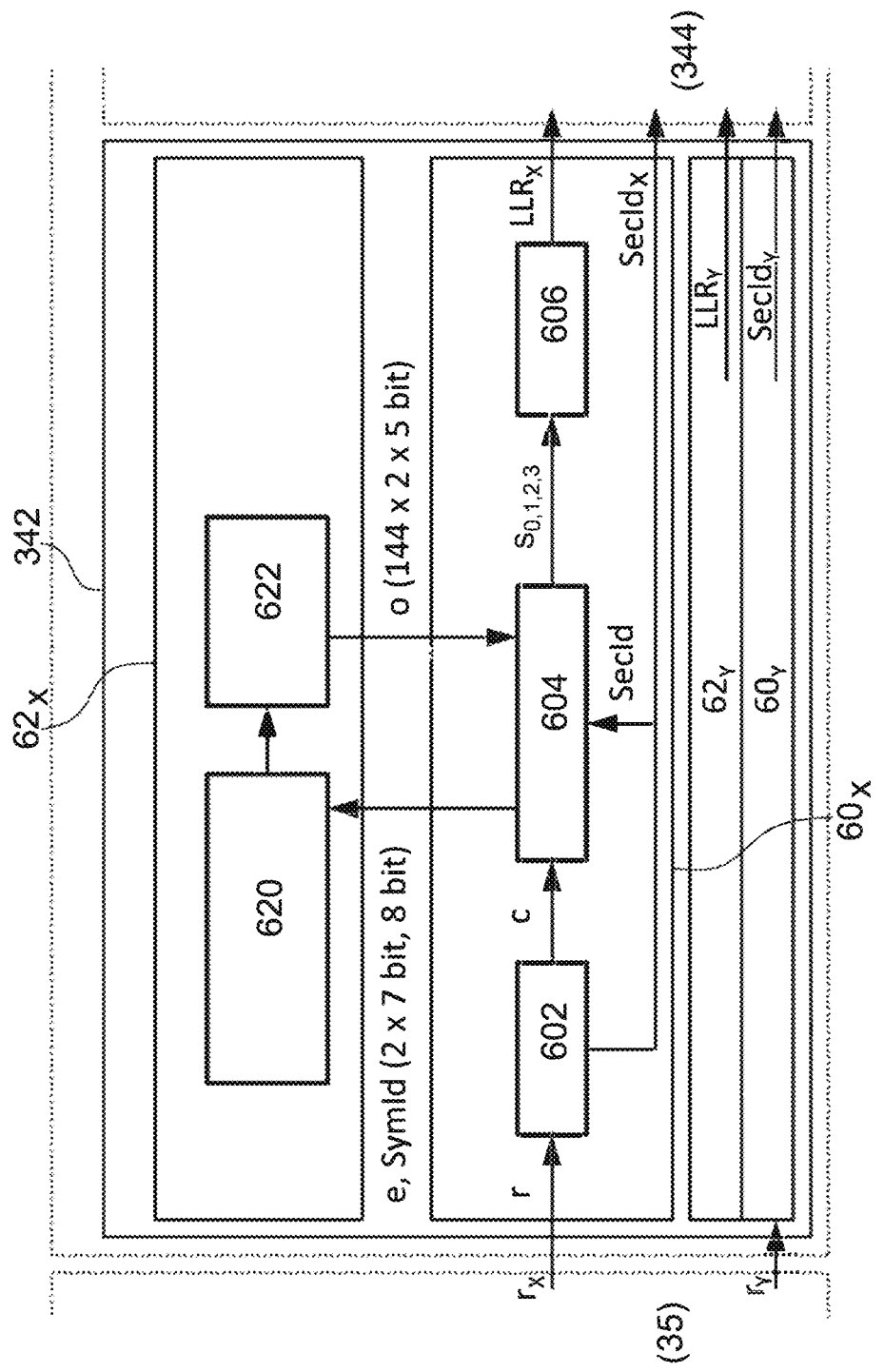
FIG. 6 illustrates an embodiment of a soft-demapper unit of a receiver configured to perform operations presented herein.

FIG. 6 is a top-level block diagram showing the topology and hierarchy of functionalities. Surrounding blocks of the Adaptive Soft-Output Demapper 342 and its internal details for signal processing of a demodulated received signal r towards soft values LLR and hard-decided sector identity "SecId" for the X polarization are shown. Processing for the Y polarization within the Adaptive Soft-Output Demapper is fully independent from and identical to that shown for the X polarization.

Per polarization, the Adaptive Soft-Output Demapper 342 contains a set of soft output DeMapper Units (DMUs) 60 and an offset unit 62. DMUs 60 and an offset unit 62 are shown for the X polarization and so are indicated as $60_X$ and $62_X$. Similar DMUs 60 and an offset unit 62 are shown for the Y polarization and are indicated in FIG. 6 as $60_Y$ and $62_Y$, with outputs $LLR_Y$ and $SecId_Y$.

Each DMU 60 comprises, for instance, a Sector Decision and Center-Offset Computation (SDCC) unit 602, an Error-Vector Computation and Squared-Euclidean Distance (ECED) unit 604 and a Log-Likelihood Ratio (LLR) Computation unit (LLRC) 606. The invention shall not be limited to one unit per polarization. For instance, a plurality of DMUs 60 (e.g. tens or hundreds of DMUs) may be provided per polarization to achieve a required data throughput at a given maximum clock rate for the digital logic.

Offset unit 62 provides to the DMUs 60 offsets o0, o1, o2, o3 etc. to be applied to the points of the constellation of symbols, as will be described further below. The offset unit 62 may comprise an offset tracking unit 620 and Look-up Tables (LUTs) 622 to store values for the per-symbol offset values (o0, o1, o2, o3 etc). The provision of an offset tracking unit 620 provides functionality for the offset unit 62 to learn scaling and per-symbol offset shifts characterizing non-linear constellation distortions for each polarization separately. These adaptive offsets are then stored in LUTs 622. For instance, there may be a LUT 622b with high resolution for use with continuous update and another LUT 622a with lower resolution for high-speed access by a correction algorithm in the DMUs 60. Further details of an embodiment of the offset unit 62 are discussed below in relation to FIG. 10.

The Adaptive Soft-Output Demapper 342 follows a multi-stage approach. The following text and the captions associated with the figures provide a detailed algorithmic description for each of the four functionalities constituting the Adaptive Soft-Output Demapper.

Figure 7:
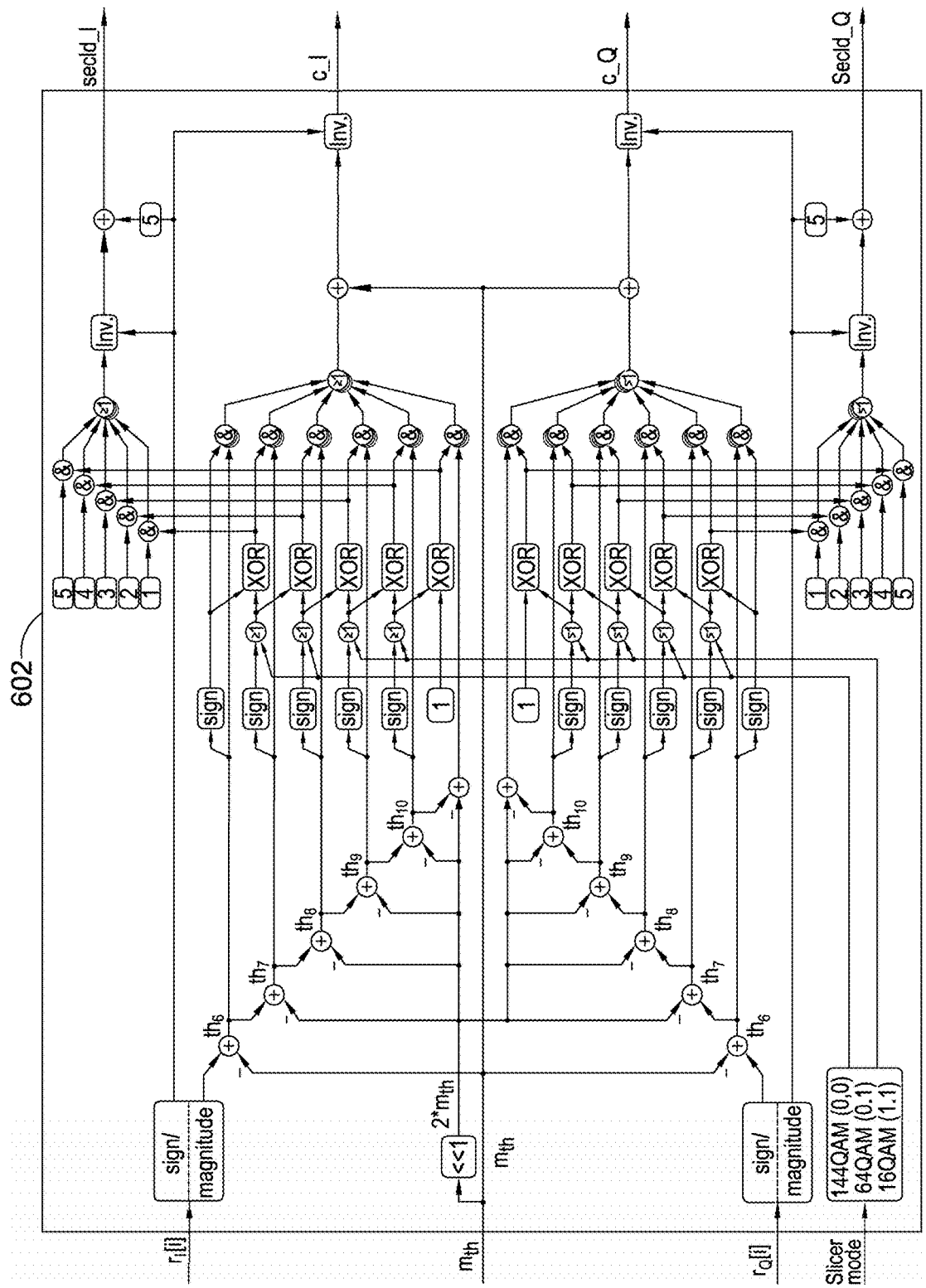
FIG. 7 illustrates an embodiment of a sector decision and center offset computation unit of FIG. 6.

FIG. 7 illustrates the components in a Sector Decision and Center-Offset Computation (SDCC) unit 602. The inputs are the I and Q components of the received signal $r_I$ and $r_Q$. Also shown are a parameter "slicerMode" and a parameter "$m_{th}$". The receiver may support a variety of constellations so a parameter "slicerMode" is introduced. The type of nominal constellation and an associated number of possible sectors is configured via the parameter "slicerMode". The parameter "$m_{th}$" sets the half-distance between points of the constellation.

FIG. 7 shows an embodiment for a constellation having an equidistant grid of nominal signal points with one programmable half-distance parameter $m_{th}$ for both the I and the Q component. This simplified model is implementation friendly and does not require a huge parameter register space. When applying this technique for coherent reception of, for example, 144-QAM, there may be for instance ten freely adaptive thresholds per I/Q to slice the received sample into 121 rectangular sectors, each with an individual size.

Table 1 gives an example overview for operating modes and numerology for QAM size and the resulting number of sectors associated with the respective mode:

TABLE 1

| slicerMode | QAM | Number of sectors |
|---|---|---|
| 00 | 144 | 121 |
| 01 | 64 | 49 |
| 11 | 16 | 9 |

In the embodiment describe here, a sector in the complex plane is synonymous with a rectangle of a QPSK sub-constellation. i.e., a group of four neighboring signal points and a subset of QAM symbols that a digital sample r from said QAM demodulator may represent.

The outputs Sector identity "SecId" and center offset "c" are generated from the received signal $r_I$ and $r_Q$, as illustrated in FIGS. 4 and 5.

FIG. 7 shows internal details for a simplified implementation for sector finding based on received signal r under the assumption of the sectors being square and of equal size. In addition to SecId, the center offset c is forwarded to the Error-Vector Computation and Squared-Euclidean Distance (ECED) unit 604, as shown in FIG. 6. The sector identity "SecId" is subsequently used to determine which QAM symbol in the subset of offset QAM symbols in the sector the output sample most likely represents, as will be described below.

Figure 8:
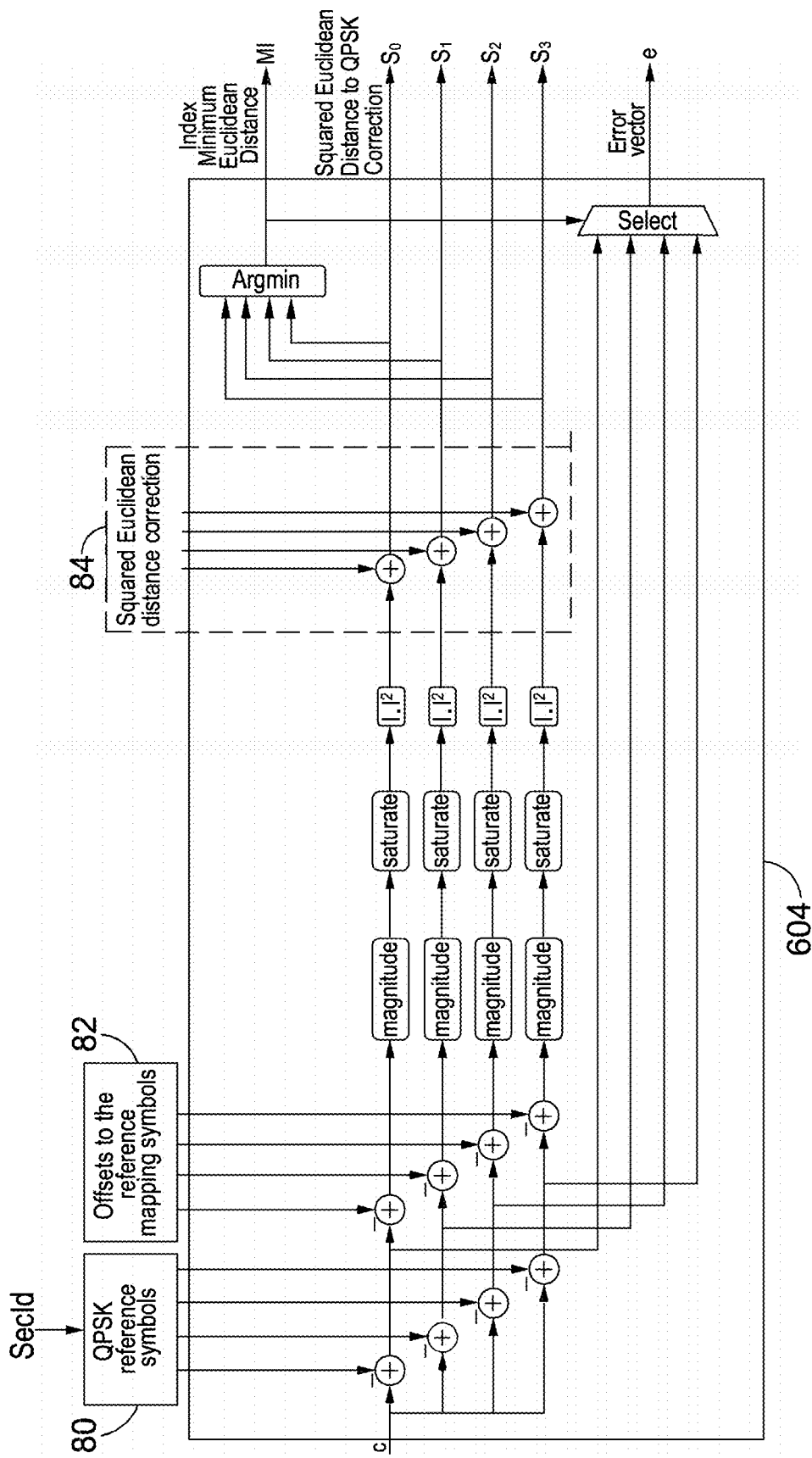
FIG. 8 illustrates an embodiment of an error-vector computation and squared Euclidean distance computation unit of FIG. 6.

FIG. 8 illustrates an embodiment of an Error-Vector Computation and Squared-Euclidean Distance (ECED) unit 604. Input to the ECED unit 604 are SecId and the center offset c. The parameter SecId identifies the sector 42 for the received sample r and thus the subset of QAM symbols P0, P1, P2, P3 that the received signal sample r is likely to represent. This subset of symbols P0, P1, P2, P3 (indicated in FIG. 8 by numeral 80) (and also referred to as QSPK reference symbols) is input to the ECED unit 604. Also input to ECED unit 604 are the per-symbol offsets o0, o1, o2, o3 (indicated in FIG. 8 by numeral 82) stored in the LUT 622. These per-symbol offsets o0, o1, o2, o3 are for the QSPK reference symbols 80 of the sector identified by SecId. Further discussion of the per-symbol offsets is given later in this disclosure.

ECED unit 604 applies the offsets 82 to the QSPK reference symbols 80 and then computes the Squared-Euclidean distances s0, s1, s2, s3 (as illustrated in FIGS. 4 and 5 and in 8 as input to 84) from the received signal sample r to each of the offset QPSK symbols. The ECED unit 604 also computes the error vector e consisting of errors e0, e1, e2, e3 from the nominal symbol points P of the subset of symbol points to the output sample r.

The ECED unit 604 outputs the Squared-Euclidean distances s0, s1, s2, s3, the index MI (0, 1, 2, 3 in this example) of the minimum Squared-Euclidean distances and the error vector e associated with the index. Thus, in this case, four squared-Euclidean distances s to the offset-corrected QPSK sub-constellation are computed from a center offset c, QPSK reference symbols, and estimated symbol offsets o.

As mentioned above, it is not intended that this disclosure is limited to constellations comprising square sectors with identical size. Application to both non-square sectors (e.g. triangular) and different sizes per sector are envisaged. For instance, in the case of a constellation with triangular sectors, three squared-Euclidean distances s to a three offset-corrected QPSK sub-constellation are computed from a center offset c, three QPSK reference symbols, and three estimated symbol offsets o.

In a further enhancement, the ECED unit 604 includes an additive squared-Euclidean distance correction part 84. This enhancement has particular application for QAM constellations without equiprobable symbols. An example of this is when signal shaping is present in the transmission system. That functionality accounts for a non-uniform a-priori probability of symbols. The additive correction part takes care of non-uniform a-priori probabilities of QAM symbols in the presence of signal shaping. The Euclidean distance correction part 84 modifies the squared Euclidean distance computation according to differing probability of neighboring symbols of the nominal constellation. The correction part 84 is configured to receive QAM symbols associated with a probabilistically-determined constellation and the offset applied to each QAM symbol in the subset of QAM symbols is associated with the probability of the QAM symbol occurring in the probabilistically-determined constellation. So, for instance, the offset o3 applied to point P3 is associated with the probability of the symbol P3 occurring in the nominal QAM constellation being used, and similarly for the other symbols in the subset of symbols (P0, P1 and P2 in the embodiments shown). The addition of Euclidean distance correction part 84 provides symbol-probability-corrected squared Euclidean distances from which the LLRs are generated, as will be described below.

LLR Computation (LLRC)

The respective squared-Euclidean distances s0, s1, s2, s3 are used to compute soft values for the Least Significant Bits (LSB) in the I component and the LSB in the Q component of the received sample r.

Figure 9:
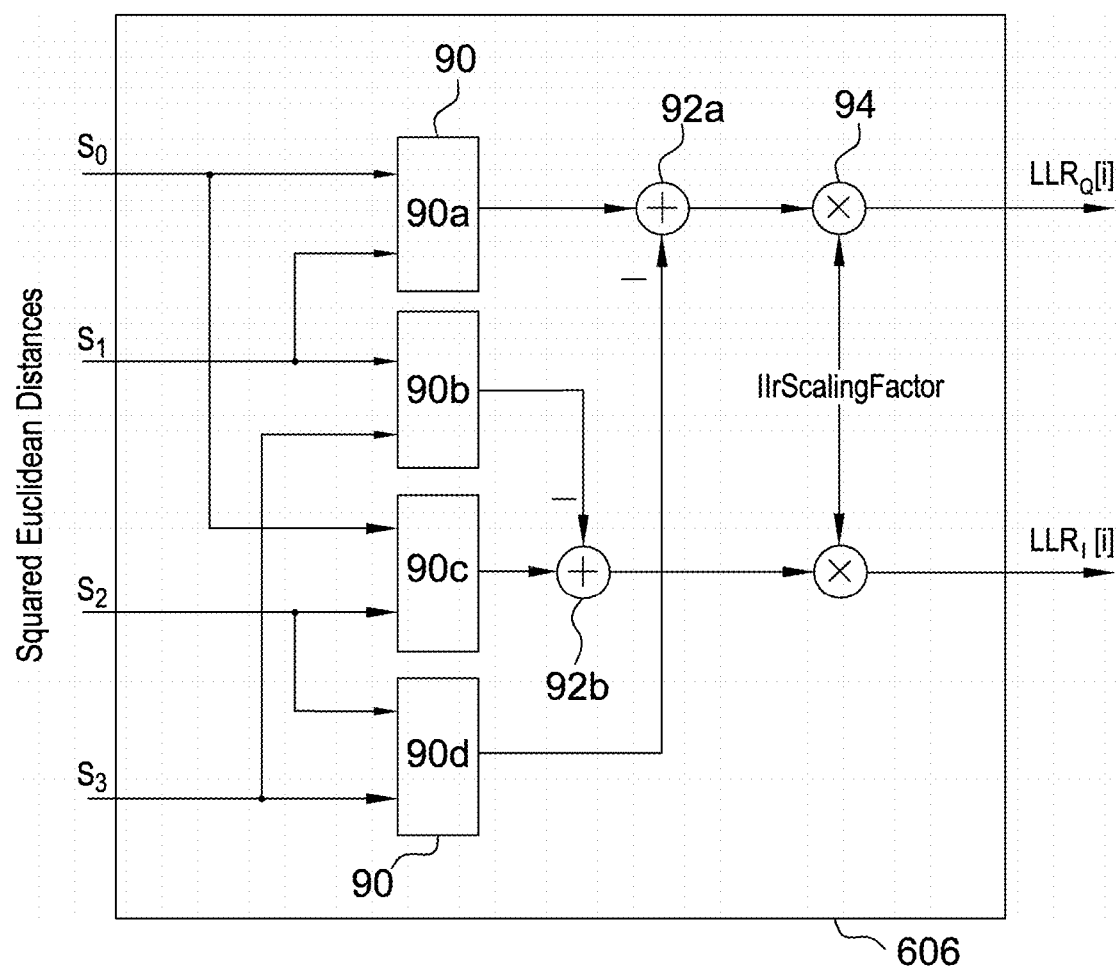
FIG. 9 illustrates an embodiment of a Log-likelihood ratio computation unit of FIG. 6.

FIG. 9 illustrates an embodiment of the LLR Computation (LLRC) unit 606 as shown in FIG. 6. Input to the LLRC unit 606 are the squared-Euclidean distances s0, s1, s2, s3 and a Log-Likelihood Ratio (LLR) is determined from these inputs.

The squared-Euclidean distances s0, s1, s2, s3 are input to selection units 90, each of which selects the minimum input. A squared Euclidean distance is related to the logarithm of symbol probability p, i.e. s~−log(p). As, in the illustrated example considered here, there are four points in the sector and so four squared-Euclidean distances, four selection units 90 are shown to consider the value of each input and identify the minimum. The minimum from each pair of selection units 90 is input to an additive unit 92 which subtracts one minimum input from the other. So, in the example shown in FIG. 9, from the top down: s0 and s1 are input to the top-most selection unit 90a; s1 and s3 are input to the next selection unit 90b; s0 and s2 are input to the next selection unit 90c; and s2 and s3 are input to the bottom-most selection unit 90d. In particular, the output of 90a corresponds to the approximation −log(p0+p1)≈min(s0, s1) when s0~−log(p0) and s1~−log(p1). The additive units 92 then receive inputs from the section units 90. So additive unit 92a receives from selection unit 90a the minimum of s0 and s1 and from selection unit 90d the minimum of s2 and s3, and additive unit 92b receives from selection unit 90b the minimum of s1 and s3 and from selection unit 90c the minimum of s0 and s2. The additive unit 92 subtracts one minimum input from the other. The subtraction in Euclidean-distance-domain corresponds to computing the logarithm of the likelihood ratio pF/pT, i.e. −log(pF/pT)≈sF−sT. An LLR scaling factor is applied by multiplier 94 to the output from each additive unit 92. The result may be rounded up and saturated to output a LLR for LSB in I and Q component, respectively. The scaling factor is determined by the noise level and also serves the purposes of making good information-theoretic use of the available word length. In some embodiments, this scaling is optimized to retain best possible mutual information.

Soft values for the LSB in the I and Q components are computed from the four squared-Euclidean distances s0, s1, s2, s3. Soft values for higher-than-LSB would require more than four nearest-neighbor distances. The embodiment illustrated shows an approximate computation via minimum search −log(p0+p1)≈min(s0, s1). This disclosure is not limited to this and may include, for instance, both the implementation of more accurate LLR computation for the one LSB per I/Q, or the computation for LLR for two or more LSBs per I/Q. Exact computation follows −log(p0+p1)=min(s0, s1)+cf(s0−s1) where a correction function cf( ) compensates for the error by the simplistic min( ) when s0 and s1 are almost equally strong, i.e. the difference s0−s1 is around zero. The correction cf( ) quickly converges to 0 when s0 and s1 differ considerably.

Symbol Offset Tracking

Figure 10:
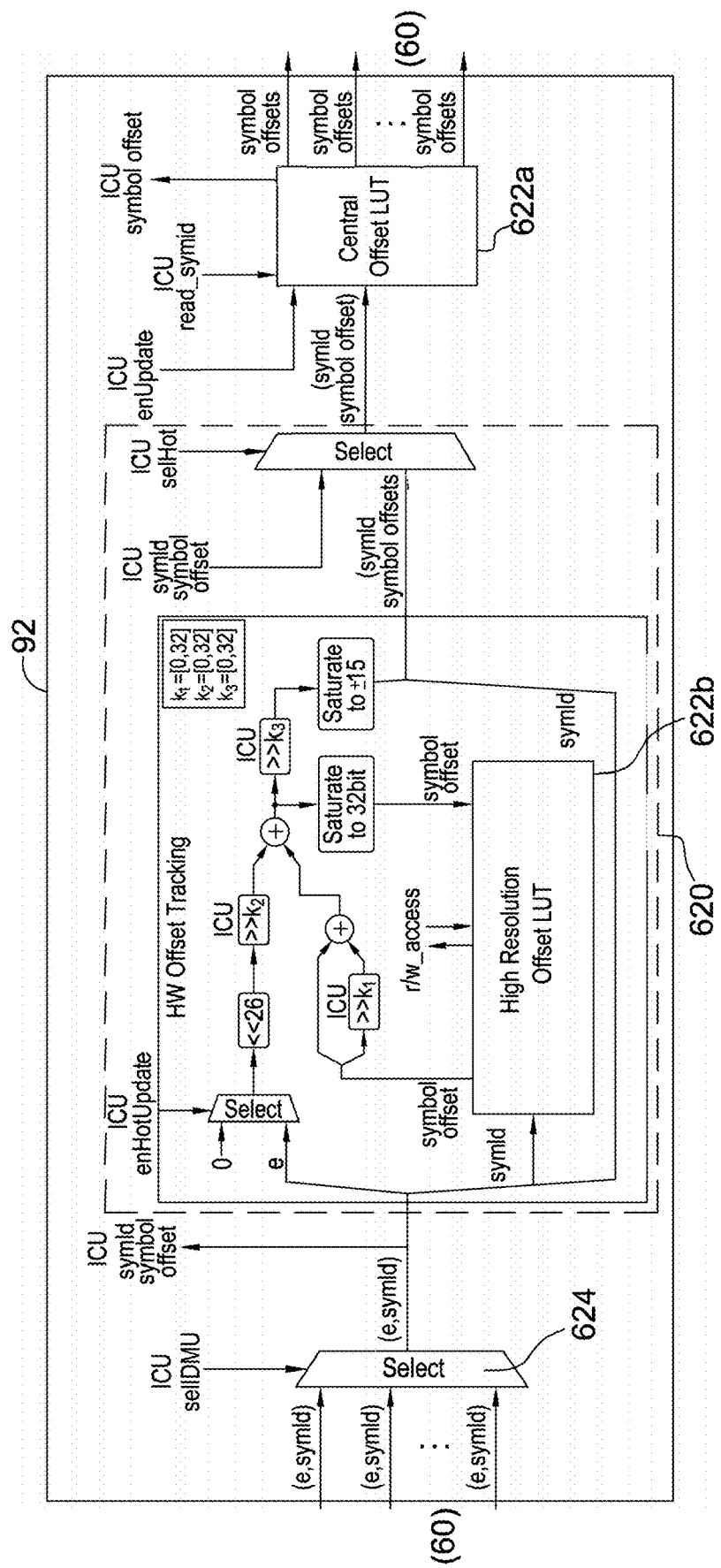
FIG. 10 illustrates an embodiment of a symbol offset tracking unit of FIG. 6.

FIG. 10 illustrates an embodiment of a hardware implementation for the offset unit 62 showing an implementation of the offset tracking unit 620 and the Look-up Tables (LUT) 622 for one polarization. In this embodiment, the offset tracking unit 620 learns scaling and per-symbol offset shifts characterizing non-linear constellation distortions for each polarization separately. These offsets are stored in Look-up Tables (LUTs) 622.

Input to the offset unit 62 are the error vector e (for example one of e0, e1, e2, e3 having the lowest magnitude for the sample r) output by the ECED unit 604 of each DMU 60 in each I and Q component, and symId, which is the index of the symbol in the full QAM constellation that the received sample r is deemed to represent. symId is derived from SecId and decision for closest QPSK sub-constellation P based on e. Please recall that e indicates how the received point lies off the perfect QAM constellation and this is also used for tracking. When considering FIG. 4 for received signal r, this would be error vector e0 and the symId for symbol point P0 in the constellation.

In the embodiment shown, a selection unit 624 selects one (e, symId) per clock cycle for the offset tracking unit 620 to determine the offset for the symbol represented by symId. Of course, more than one input (e, symId) may be selected per clock cycle with these being processed in parallel by multiple offset tracking units 620 or by an offset tracking unit 620 that has the functionality to process more than one symbol offset at a time.

The per-symbol offsets o0, o1, o2, o3 etc., may be fixed or may be adaptive. For embodiments where the offsets are fixed, the offset tracking unit 620 may be omitted and the offset unit 62 simply receives the symbol identifier symId and supplies the associated symbol offset for that symbol from the central offset LUT 622a. However, in other embodiments, the per-symbol offsets are adaptive over the long-term. Such long-term adaptive per-symbol offsets may be learnt by the offset tracking unit 620.

The offsets may represent characteristics of any of the transmitter, the transmission path and the receiver. The offset may be a fixed value for each QAM symbol, for instance based on characteristics of any of the transmitter, the transmission path and the receiver. Such offset characteristics may be learnt via a training signal or may be programmed into the receiver on production or commission. Alternatively, the offsets for each QAM symbol may be adaptive, with the receiver adapting the offsets over time, as discussed above. The offset may be stored in memory in the form of a look-up table (LUT) 622 for the offset for each of the QAM symbols of the constellation.

For instance, the per-symbol offsets may be based on upfront data, with the offsets being programmed into the LUT 622a of the receiver based on upfront knowledge of distortion characteristics of any of the receiver, the transmitter and the transmission path e.g. the a-priori known offset per symbol resulting from distortion caused by components of the receiver.

The per-symbol offsets may be based on acquired data e.g. representing distortions introduced by characteristics of any of the receiver, the transmitter and the transmission path. For instance, such characteristics may be learnt e.g. from a training sequence of data received by the receiver. The transmitter may send a training sequence of symbols to the receiver. The training sequence is made available by the receiver and as a result the receiver determines which symbols in which order are being transmitted and received. The receiver may then determine the per-symbol offsets (o0, o1, o2, o3 etc.) from the signals received compared with the nominal signals (P0, P1, P2, P3 etc.) of the undistorted constellation. The per-symbol offsets may then be stored in the LUT 622a.

Adaptive per-symbol offsets may be determined based on operation of the receiver over time. For instance, the error vector e and the symbol identity of the symbol most likely to be represented by the received signal r may be monitored and the per-symbol offsets adapted accordingly.

FIG. 10 shows an embodiment of an offset tracking unit 620 to implement this adaptive approach. Input to the offset tracking unit 620 are the error vector e (for example the lowest of e0, e1, e2, e3 for the sample r) output by the ECED unit 604 of each DMU 60 in each I and Q component, and symId, which is the ID of the symbol of the sector that the received sample r is deemed to represent. When considering FIG. 4 for received signal r, this would be error vector e0 and the symId for symbol point P0 in the QPSK sub-constellation.

The offset tracking unit 620 receives the error vector e and symId and updates and outputs the adaptive offset for the symbol represented by symId. The embodiment of FIG. 10 shows a low-complexity smoothing of an estimated symbol offset with input selection of a single error vector e from the offered multi-fold. The old complex-valued symbol offset o associated with symId is read from high-resolution LUT. Complex-valued error e is added to the old offset. This noisy offset is then averaged by means of a one-tap IIR filter (i.e. addition of old state large weight with low-weighted input) producing the new complex-valued symbol offset stored as high-resolution state variable associated with symId. Hence, per processed input pair (e, symId) one offset is updated. This offset adaptation procedure ensures that the long-term average of error converges to zero. This disclosure is not limited to this and may include, for instance, the use of more than one error vector to improve the statistics, or the use of more sophisticated filtering. The update rate per offset is therefore not constant and depends on the signal statistics. The method may also not down-select and process all offered inputs when either channel variations are fast or when processing complexity is acceptable. For data-path processing, the high-resolution state variable is quantized and saturated before storing it into a low-resolution LUT 622a.

The individual offset of each QAM symbol is tracked and made available from LUT 622a for processing by the ECED unit 604 (for example as a 5 bit offset per I/Q) and per each of up to the full set (e.g. 144) of QAM symbol points of the constellation on which coding is based. Note that when offsets are constant and can be pre-determined, no adaptation at run-time is required. The central offset LUT 622a can then be a read-only memory.

Figure 11:
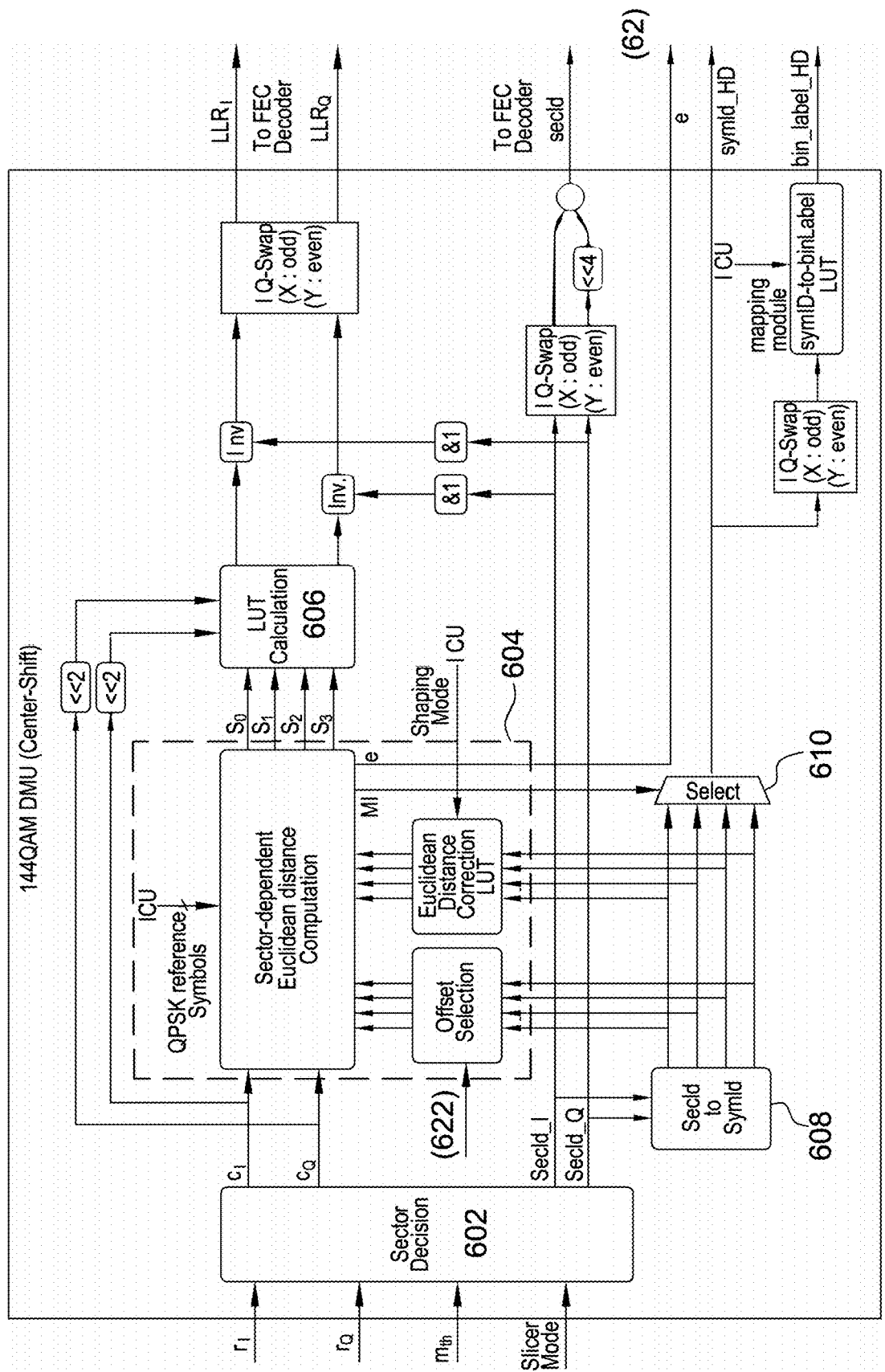
FIG. 11 illustrates an embodiment of a soft-demapper unit of a receiver of FIG. 6.

FIG. 11 is an expanded version of FIG. 6 showing an embodiment of a soft-output demapper unit (DMU) 60 with the inputs and outputs. In addition, FIG. 11 shows component 608 that receives the SecId and determines the subset of QAM symbols that define the sector identified by SecId and component 610 which determines which QAM symbol in the subset of offset QAM symbols in the sector identified by SecId the output sample r most likely represents and outputs data symId representing the determined QAM symbol. The DMU also outputs the binary label (i.e. the bit pattern) binLabel_HD that the symbol symId represents.

Figure 12:
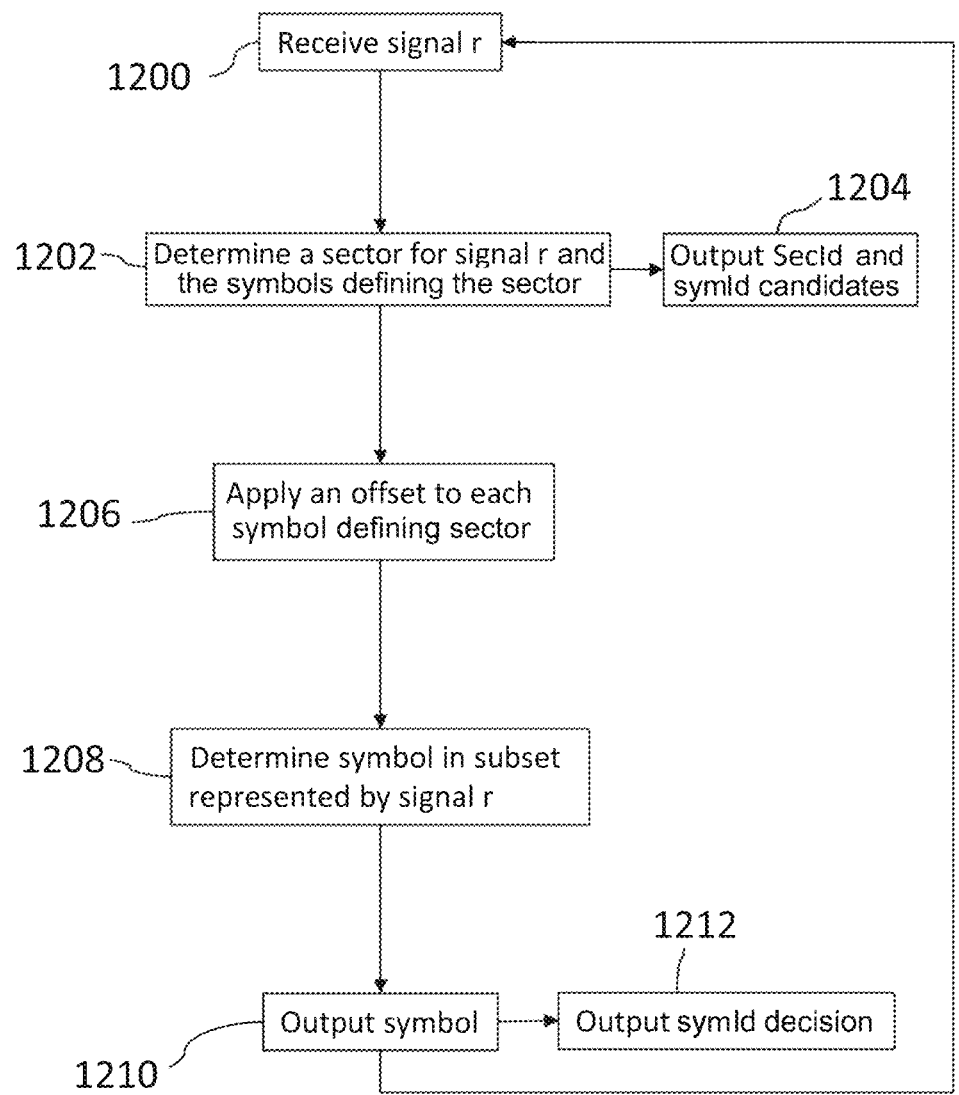
FIG. 12 is a flow chart illustrating a method to carry out techniques presented herein.

FIG. 12 is a flow diagram of a method for carrying out the described technique, with parameters as described with reference to FIGS. 4 and 5, with a received IQ signal r. When the signal r is received from modem 35 (operation 1200), a sector 42 is determined (operation 1202) based on the signal r. This may comprise determining from a constellation of QAM symbols a subset of QAM symbols that the sample r from the QAM demodulator may represent to define a sector 42. The sector 42 is defined by nominal signal points 40 (or symbol points) on a non-distorted QAM constellation suitable for the received signal r. Sector 42 represents a subset of QAM symbols that a digital sample r from said QAM demodulator may represent. In FIG. 4 the subset of QAM symbols that output sampler from said QAM demodulator may represent includes the four symbols $P_0$, $P_1$, $P_2$ and $P_3$. This subset of QAM symbols is identified as sector 42 in the constellation, with the output sample r usually being within this sector, except for corner cases like as illustrated in FIG. 5. This sector 42 is identified by an identifier SecId. The sector identifier SecId is unique and is defined by a plurality of symbols e.g. in the example shown by four symbols defining each corner, each symbol having an associated identifier symId. Decision for one out of the four symId in the corners of SecId later allows for hard decision of the MSBs of the output sample r. The sector identity SecId and four symId candidates are provided as an output (operation 1204).

For the symbols defining the selected sector 42, an offset is applied (operation 1206) to each QAM symbol in the subset of QAM symbols of the constellation to result in a subset of offset QAM symbols associated with the four symId candidates. This may be implemented by the operations shown in FIG. 13.

The method then determines which QAM symbol in the subset of offset QAM symbols the output sample r most likely represents (operation 1208) and data is then output representing the determined QAM symbol (operation 1210). The symbol symId decision is provided as an output (operation 1212). Hard decisions for MSBs can be generated from that symId decision.

The process then returns to the start (operation 1200) for the next signal r from the modem 35.

Figure 13:
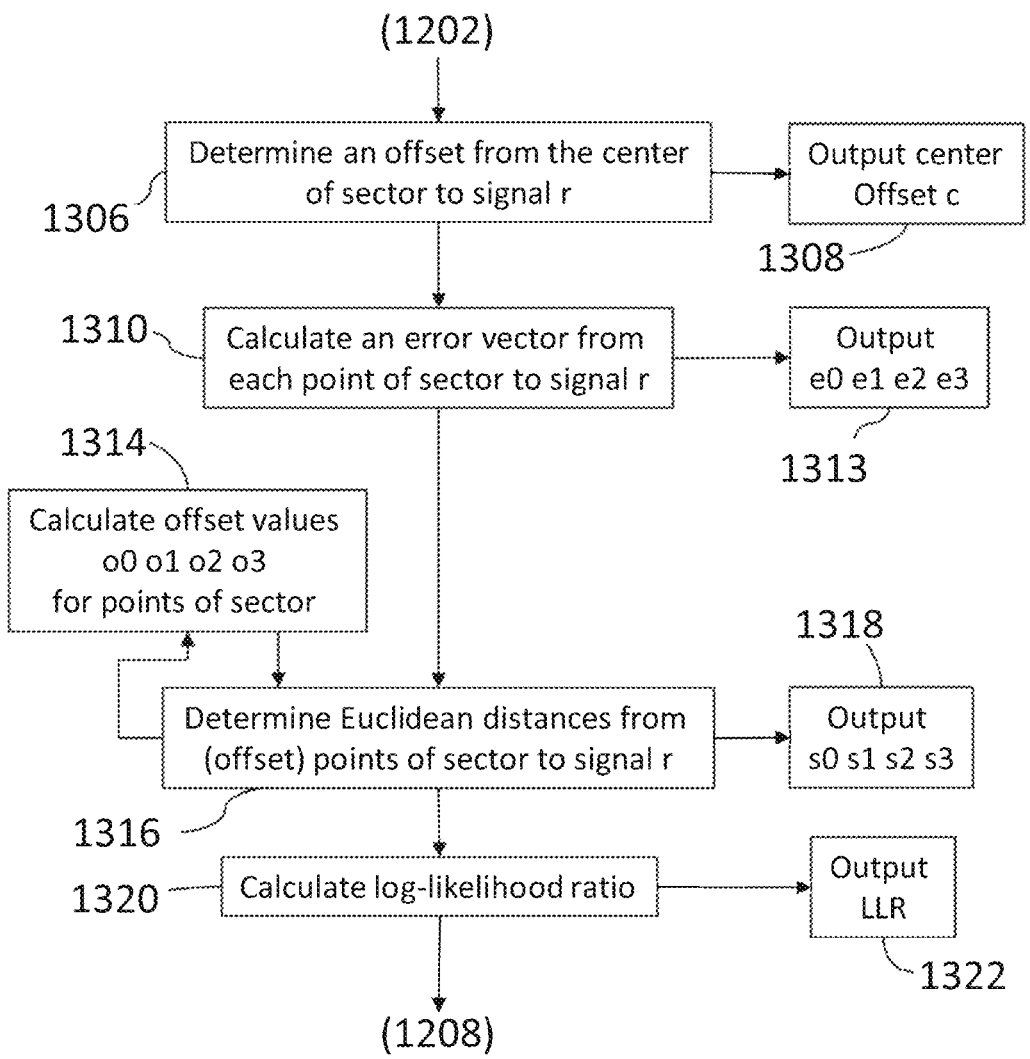
FIG. 13 is a flow chart illustrating further operations of the method of FIG. 12.

As shown in FIG. 13 the operation 1204 of applying an offset to each QAM symbol in the subset of QAM symbols of the constellation to result in a subset of offset QAM symbols may comprise operations 1306-1322. These operations involve calculating a center offset value c from the center of sector 42 to the output sample r (operation 1306) and providing this as an output (operation 1308) and calculating error vectors e0, e1, e2, e3 from the nominal symbol points P of the subset of symbol points to the output sample r (operation 1310) and providing these as an output (operation 1313). Further, the (fixed or long-term adaptive) per-symbol offsets o0, o1, o2, o3 for the associated corrected QAM symbols (dotted circles) are calculated (operation 1314) and the Euclidean distances s0,1,2,3 (dashed lines) from the offset symbols with respect to the output sample r are calculated (operation 1316) and output (operation 1318). The offsets determined in operation 1314 are fed back into the calculation of the Euclidean distances (operation 1316) to be applied to the offset points of the constellation, that results in a subset of offset QAM symbols.

The log-likelihood ratio is then calculated (operation 1320) as described above and output (operation 1322). This is then used to determine which QAM symbol in the subset of offset QAM symbols the output sample r most likely represents (operation 1210) and data is then output representing the determined QAM symbol (operation 1212).

The technique of this disclosure therefore provides a receiver for receiving Quadrature Amplitude Modulated "QAM" symbols from a transmitter via a transmission path that ameliorates errors introduced by components at the transmitter, in the transmission path or in the receiver. Such a receiver generally comprises a demodulator for down converting an incoming RF signal to baseband and converting said baseband signal to digital samples and a demapper coupled to receive the digital samples output from the demodulator and configured to output data encoded in QAM symbols. The demapper is generally configured to: determine from a constellation of QAM symbols a subset of QAM symbols (e.g. P0 P1 P2 P3) that a digital sample (e.g. r as shown in FIG. 4) from said QAM demodulator may represent, apply an offset (e.g. o0 of o2 o3 as shown in FIG. 4) to each QAM symbol in the subset of QAM symbols of the constellation to result in a subset of offset QAM symbols; determine which QAM symbol in the subset of offset QAM symbols the output sample most likely represents; and output data (e.g. symId) representing the determined QAM symbol.

Soft-value generation for LSBs in a coherent QAM multi-level coding application suffering from non-linear distortion has been described. This allows for close-to-optimum error performance while having acceptable compute complexity for an ASIC implementation. The disclosed technique splits a large QAM constellation into a plurality of QPSK sub-constellations (sectors) and calculates offset-value-corrected squared Euclidean distances from which LLRs are generated.

Future coherent optical interfaces with high-order modulation may benefit from availability of such an algorithm at the receiver end, as non-linearity may be a critical impairment for a coherent in-phase quadrature transmitter.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A receiver for receiving Quadrature Amplitude Modulated (QAM) symbols from a transmitter via a transmission path, the receiver comprising:
    a demodulator configured to down-convert an incoming Radio Frequency (RF) signal to a baseband signal and convert said baseband signal to digital samples, and output said digital samples; and
    a demapper coupled to receive the digital samples output from the demodulator and configured to output data encoded in QAM symbols, wherein the demapper is configured to:
        determine from a constellation of QAM symbols a subset of QAM symbols that a digital sample from said demodulator may represent;
        apply an offset to each QAM symbol in the subset of QAM symbols of the constellation to result in a subset of offset QAM symbols;
        determine which QAM symbol in the subset of offset QAM symbols the digital sample most likely represents; and
        output data representing a determined QAM symbol.

2. The receiver of claim 1, wherein the offset represents characteristics of any of the transmitter and the receiver.

3. The receiver of claim 1, wherein the offset represents characteristics of the transmission path.

4. The receiver of claim 1, wherein the offset for each QAM symbol is adaptive.

5. The receiver of claim 1, further comprising memory and a look-up table of the offset for each of the QAM symbols stored in the memory.

6. The receiver of claim 1, further configured to receive QAM symbols associated with a probabilistically-determined constellation.

7. The receiver of claim 6, wherein the offset applied to each QAM symbol in the subset of QAM symbols is associated with a probability of the QAM symbol occurring in the probabilistically-determined constellation of QAM symbols.

8. A method of receiving Quadrature Amplitude Modulated (QAM) symbols from a transmitter via a transmission path, the method comprising:
    down-converting an incoming Radio Frequency (RF) signal to a baseband signal and converting said baseband signal to digital samples;
    determining from a constellation of QAM symbols a subset of QAM symbols that a digital sample may represent;
    applying an offset to each QAM symbol in the subset of QAM symbols of the constellation to result in a subset of offset QAM symbols;
    determining which QAM symbol in the subset of offset QAM symbols the digital sample most likely represents; and
    outputting data representing a determined QAM symbol.

9. The method of claim 8, wherein the offset represents characteristics of any of the transmitter and a receiver.

10. The method of claim 8, wherein the offset represents characteristics of the transmission path.

11. The method of claim 8, wherein the offset for each QAM symbol is adaptive.

12. The method of claim 8, further comprising storing the offset for each of the QAM symbols stored in a look-up table in memory.

13. The method of claim 8, further comprising receiving QAM symbols associated with a probabilistically-determined constellation.

14. The method of claim 13, further comprising applying the offset to each QAM symbol in the subset of QAM symbols, wherein the offset applied to each QAM symbol in the subset of QAM symbols is associated with a probability of the QAM symbol occurring in the probabilistically-determined constellation of QAM symbols.

15. A non-transitory computer-readable medium comprising instructions that, when executed by a computer, cause the computer to:
    determine from a constellation of Quadrature Amplitude Modulated (QAM) symbols obtained from a Radio Frequency (RF) signal that is down-converted to baseband and converted to digital samples, a subset of QAM symbols that a digital sample may represent;
    apply an offset to each QAM symbol in the subset of QAM symbols of the constellation to result in a subset of offset QAM symbols;
    determine which QAM symbol in the subset of offset QAM symbols the digital sample most likely represents; and
    output data representing a determined QAM symbol.

16. The non-transitory computer-readable medium of claim 15, wherein the offset represents characteristics of any of a transmitter that transmitted the RF signal, a transmission path over which the RF signal is transmitted, and a receiver that receives the RF signal.

17. The non-transitory computer-readable medium of claim 15, wherein the offset for each QAM symbol is adaptive.

18. The non-transitory computer-readable medium of claim 15, wherein the instructions further cause the computer to store the offset for each of the QAM symbols stored in a look-up table in memory.

19. The non-transitory computer-readable medium of claim 15, wherein the instructions further cause the computer to receive QAM symbols associated with a probabilistically-determined constellation.

20. The non-transitory computer-readable medium of claim 19, wherein the instructions further cause the computer to apply the offset to each QAM symbol in the subset of QAM symbols, wherein the offset applied to each QAM symbol in the subset of QAM symbols is associated with a probability of the QAM symbol occurring in the probabilistically-determined constellation of QAM symbols.

* * * * *